United States Patent [19]

Kanamaru

[11] Patent Number: 4,858,024

[45] Date of Patent: Aug. 15, 1989

[54] APPARATUS FOR REPRODUCING FREQUENCY-DIVISION MULTIPLEXED VIDEO FM AND DIGITAL AUDIO SIGNALS

[75] Inventor: Hitoshi Kanamaru, Saitama, Japan

[73] Assignee: Pioneer Electronic Corporation, Tokyo, Japan

[21] Appl. No.: 176,503

[22] Filed: Apr. 1, 1988

[30] Foreign Application Priority Data

Apr. 9, 1987 [JP] Japan ................................. 62-88199

[51] Int. Cl.$^4$ .......................... H04N 5/76; G11B 7/00
[52] U.S. Cl. .................................. 358/310; 358/343; 358/328; 358/330; 369/44
[58] Field of Search ............... 358/330, 310, 341, 343, 358/342, 328; 360/19.1, 27, 32, 39, 48; 369/59, 43–47

[56] References Cited

U.S. PATENT DOCUMENTS 4,389,681  6/1983  Tanaka et al. ..................... 360/27
4,707,818  11/1987 Suzuki et al. ..................... 369/59

OTHER PUBLICATIONS

Japanese Abstract 58-225784, 12-27-83.

Primary Examiner—Robert L. Richardson
Attorney, Agent, or Firm—Sughrue, Mion, Zinn, Macpeak & Seas

[57] ABSTRACT

A recorded-information reproducing apparatus, such as a video disk player, in which interference generated as a result of pulse-width modulation multiplexing of a luminance signal and eight-to-fourteen modulation digital audio signal is recorded on the recording medium. A low-pass filter is provided to filter the signal read out from the recording medium having a cut-off frequency higher than a white peak of the video FM signal and lower than the frequency of the color subcarrier contained in the upper first sideband of the video FM signal. The filter may take the form of either an electronic filter which filters the read-out signal following detection or a diaphragm for controlling the aperture of an objective lens through which the optical read-out signal passes.

8 Claims, 3 Drawing Sheets

APPARATUS FOR REPRODUCING FREQUENCY-DIVISION MULTIPLEXED VIDEO FM AND DIGITAL AUDIO SIGNALS

BACKGROUND OF THE INVENTION

The present invention relates to a recorded-information reproducing apparatus. More particularly, the invention relates to a recorded-information reproducing apparatus for reproducing a recording medium on which is recorded a video FM signal and a digital audio signal frequency-division multiplex recorded thereon.

As recording media carrying video FM signals and digital audio signals frequency-division multiplex recorded thereon, so-called Hi-Fi video disks on which well-known video disk recording signals and EFM (eight-to-fourteen modulation) digital audio signals in a CD (compact disk) format are multiplex recorded have been commercialized. In such a Hi-Fi video disk, analog audio FM signals for two (right and left) channels are included in the information recorded on the disk. In the case, however, where the video signal band, determined by the width of the sidebands of the video FM signal, is made too wide, both the reproduced video and analog audio signals are affected by interference with the analog audio carrier. Consequently, it is difficult to make the video signal bandwidth more than about 4.2 MHz, resulting in a limit in resolution.

In this regard, in commonly assigned Japanese Patent Application No. 61-305782 there has been proposed a recording system in which no analog audio FM signal is recorded, and only an EFM digital audio signal is recorded as the audio signal so as to widen the available video bandwidth to thereby improve the resolution. FIG. 1 shows the frequency spectrum of a high frequency signal read from a recording medium carrying information recorded with the foregoing recording system. In the drawings, $A_-$ represents an EFM digital audio signal, and $A_+$ represents the upper sideband generated as a result of pulse-width modulation multiplexing Y represents the spectrum of the video FM signal, and $C_{+1}$ and $C_{-1}$ respectively represent the upper and lower first sidebands of the chroma signal contained in the video signal. Further, $I_1$ and $I_2$ represent main components of an interference spectrum generated as a result of pulse-width modulation multiplexing of Y and $A_-$.

FIG. 2 shows the frequency spectrum of a video signal output obtained by demodulating a high frequency signal having a frequency spectrum as described above and which is read from a recording medium. As seen from the frequency spectrum, a high-level interference component due to $I_1$ is present in the video signal band at the high frequency end. This high-level interference component may cause beat interference in the chroma component C, lowering of the SN ratio of the Y (luminance) signal, or deterioration in the quality of the reproduced picture.

SUMMARY OF THE INVENTION

The present invention has been attained in view of the foregoing, and a specific object of the invention is to provide a recorded-information reproducing apparatus in which interference components due to $I_1$ and $I_2$ are reduced to thereby make it possible to improve the quality of the reproduced picture.

An apparatus for reproducing recorded information from a recording medium having a video FM signal and a digital audio signal frequency-division multiplex recorded thereon, according to the present invention, is arranged so that a low-pass filter is provided in the path of the read-out signal from the recording medium, and a cut-off frequency of the low-pass filter is selected to be higher than the white peak frequency of the video FM signal and lower than the frequency of the color sub-carrier contained in the upper first sideband of the video FM signal.

DESCRIPTION OF THE PREFERRED EMBODIMENTS

Preferred embodiments of the present invention will now be described in detail with reference to the accompanying drawings.

Figure 3:
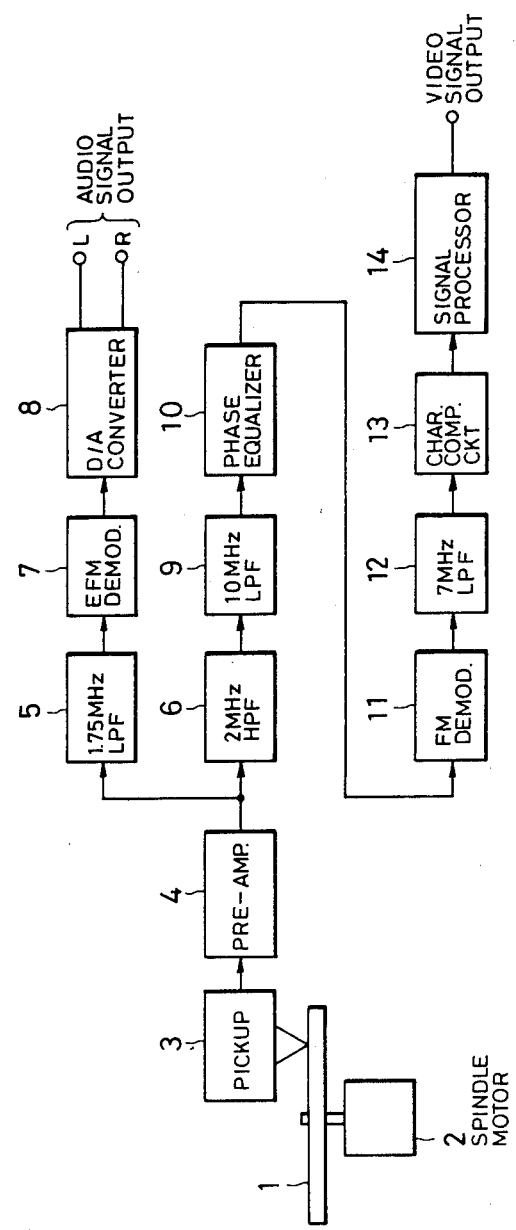
FIG. 3 is a block diagram showing a preferred embodiment of a reproducing apparatus of the present invention.

FIG. 3 is a block diagram showing a preferred embodiment of a reproducing apparatus of the present invention applied to a video disk player by way of example. In the drawing, a video disk 1 acting as a recording medium is rotated by a spindle motor 2, and the information recorded on the video disk 1 is read by an optical pickup 3. A high frequency signal read by the pickup 3 is amplified by a pre-amplifier 4, and supplied to an LPF (low-pass filter) 5 having a cut-off frequency of 1.75 MHz as well as to an HPF (high-pass filter) 6 having a cut-off frequency of 2 MHz. After being separated from the high frequency signal through the LPF 5, an EFM signal is demodulated by an EFM demodulator 7 and then converted into as analog signal by a D/A converter 8 and applied from the D/A converter 8 as audio signals for right and left channels.

A video FM signal separated from the high frequency signal through the HPF 6, on the other hand, is further band-limited by an LPF 9 having a cut-off frequency of 10 MHz. Phase distortion of the video FM signal caused by the LPF 9 is corrected by a phase equalizer 10 in the succeeding stage so as to obtain a signal having a flat phase characteristic. The resulting signal is in turn supplied to a video FM demodulator 11. (If the LPF 9 has a flat phase characteristic, it is not necessary to provide the phase equalizer 10.)

Figure 1:
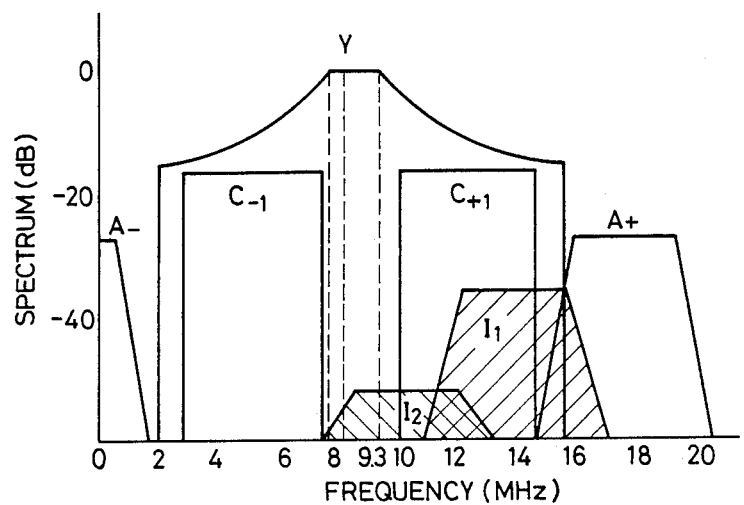
FIG. 1 shows the frequency spectrum of a high frequency signal read from a disk.
Figure 2:
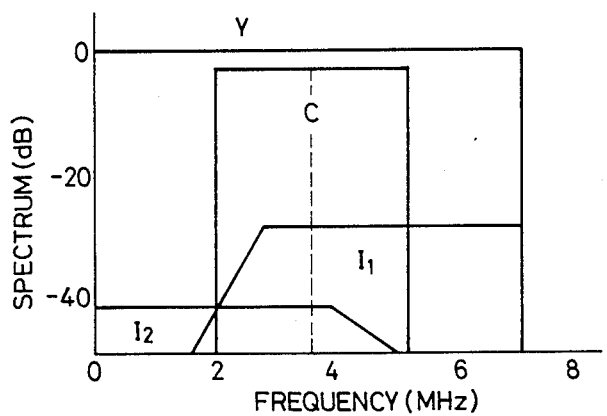
FIG. 2 shows the frequency spectrum of a video signal obtained by demodulating a high frequency signal having the frequency spectrum of FIG. 1 without any processing.
Figure 4:
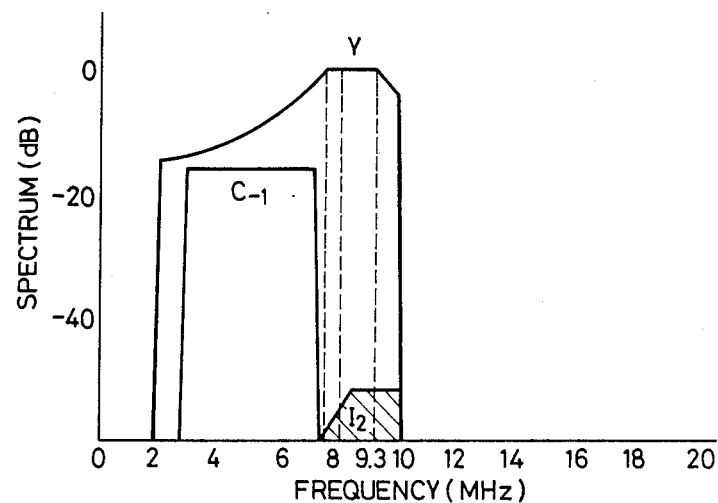
FIG. 4 shows the frequency spectrum of a high frequency signal applied to a video FM demodulator in FIG. 3.

FIG. 4 shows the frequency spectrum of the video FM signal, which is a high frequency signal band-limited by the LPF 9. As will be apparent from a comparison with FIG. 1, it is preferable to make the cut-off frequency of the LPF 9 higher than the white peak frequency (9.3 MHz) of the video FM signal and lower than a frequency in the vicinity of the lower side of the upper first sideband of the chroma signal.

Figure 5:
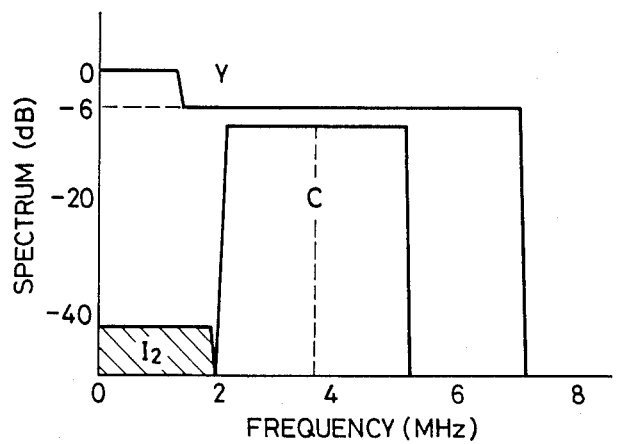
FIG. 5 shows the frequency spectrum of a video signal after demodulation.

As a result, in the frequency spectrum of the video FM signal supplied to the video FM demodulator 11, there is substantially no upper sideband containing the interference spectrum Il. As is known well, however, since the upper sideband can be regenerated from the lower sideband by passing the video FM signal through a limiter in a demodulator, no difficulty is caused in demodulation in the video FM demodulator 11. FIG. 5 shows the frequency spectrum of the video signal demodulated by the video FM demodulator 11 and in which unnecessary frequency components have been removed through an $LPF_{12}$ having a cut-off frequency of 7 MHz. As will be apparent from a comparison with FIG. 1, no interference components due to $I_1$ are present and interference components due to $I_2$ are limited to a narrow frequency band so that the interference components due to $I_1$ and $I_2$ can be substantially entirely removed.

Being subjected to band limiting by the LPF 9 and then subjected to FM demodulation as described above, the high band portion of the luminance signal Y, including the chroma signal C, is reduced by about 6 dB, as may be seen from FIG. 5. This is because the low band portion of the luminance signal Y is transmitted with both side bands and the high band portion of the luminance signal Y, including the chroma signal C, is transmitted with one side band. The foregoing problem can be alleviated if compensation is made to lower the low band of the frequency characteristic of the luminance signal Y by about 6 dB, as shown by a broken line in FIG. 5, with a characteristic compensation circuit 13 provided in the succeeding stage of the LPF 12. The same improvement as described above can be attained, alternatively, by effecting compensation so as to raise the high band of the luminance signal C, including the chroma signal C, by about 6 dB.

Here, the frequency of the video signal having such a spectrum with a level difference of 6 dB as shown in FIG. 5 varies up and down with respect to the APL (average picture level) of the video signal. That is, as seen from FIG. 4, the frequency reaches the minimum value at the white peak level and the maximum value at the blanking level. The frequency characteristic of the video signal can be made flat so that no peak nor notch is generated in the frequency characteristic, for example, if the APL level is continuously detected to thereby control the crossover frequency for improving the frequency characteristic of the characteristic compensation circuit 13.

The video signal having a frequency characteristic improved by the characteristic compensation circuit 13 is outputted as the video output signal after signal processing, if desired, to superimpose a character signal or the like on the video signal in a signal processor 14.

Although the cut-off frequency of the LPF 9 is set to the lower limit (10 MHz) of $C_{+1}$ in the foregoing embodiment, the cut-off frequency may be selected to be a value lower than a frequency corresponding to the color subcarrier frequency in the vicinity of a lower limit of $I_1$. In this case, however, a part of $C_{+1}$ (the sideband at the lower frequency side) extends into the passband of the LPF 9 so that a signal at a frequency at which the level difference of 6 dB occurs in the spectrum of the video signal after demodulation is generated in the lower sideband of the chroma signal C (FIG. 5), thereby reducing the differential gain (DG) and differential phase (DP). Therefore, it is preferable to set the cut-off frequency of the LPF 9 at a value in a range for which substantially no reduction in the D and the DP occurs.

Although the LPF 9 having a cut-off frequency of, for example, 10 MHz is used to remove the upper sideband containing the interference spectrum in the foregoing embodiment, the same cut-off characteristic as described above can be realized by suitably selecting the numerical aperture NA of an objective lens used in the pickup 3. That is, in an optical video disk system, laser light is used for reading the recorded information and an objective lens having an NA of 0.5 is generally used for focusing the laser light on the pits of a disk in the form of a light spot having a predetermined diameter. In the reading cut-off frequency $f_0$ is calculated on the basis of the expression:

$$f_0 = 2(NA)V/k$$

with parameters selected such that the wavelength k of the laser light is set to 780 nm, the numerical aperture NA of the object lens is set to 0.5, and the relative velocity V of the disk is set to 10.6 m/s, which are typical values used in an optical disk player, a result of $f_0 = 13.6$ MHz is obtained. Therefore, from the foregoing expression, if NA is set to 0.37, it is possible to realize $f_0 = 10$ MHz. That is, if a diaphragm is provided for the objective lens so as to set the value of NA in the widthwise direction of a recording track of a video disk to 0.5 and the value of NA in the advancing direction of the track to 0.37, it is possible to obtain the desired reading cut-off frequency characteristic without increasing the reading spot diameter in the widthwise direction of th track. In this case, the LPF 9 having a cut-off frequency of 10 MHz and the phase equalizer 10 of FIG. 3 become unnecessary.

As described above, in the recorded-information reproducing apparatus according to the present invention, a low-pass filter is provided in a path of the read-out signal from the recording medium, and the cut-off frequency of the low-pass filter is selected to be higher than the white peak frequency of a video FM signal and lower than the color subcarrier frequency contained in the upper first sideband of the video FM signal. As a result, the amount of beat interference occurring in the reproduced chroma signal is considerably reduced, and deterioration of the quality of the reproduced picture due to cross modulation interference considerably reduced.

Further, the present invention can be applied not only to a so-called broadband video disk system in which an analog audio FM signal is omitted, but also to a conventional Hi-Fi video disk system in which an analog audio FM signal is employed. The same advantageous effects as discussed above are attained in this case too.

What is claimed is:

1. An apparatus for reproducing recorded information form a recording medium having a video FM signal and a digital audio signal frequency-division multiplex recorded thereon, comprising: means for reading said signals recorded on said recording medium; and a low-pass filter for filtering a read-out signal produced by said reading means, a cut-off frequency of said low-pass filter being higher than a white peak frequency of said video FM signal and lower than a frequency of a color subcarrier contained in an upper sideband of said video FM signal.

2. The recorded-information reproducing apparatus according to claim 1, wherein said recording medium is a video disk, wherein said reading means comprises an objective lens disposed in the optical path of an optical signal read from said disk, and wherein said low-pass filter comprises means for establishing a first numerical aperture NA of said objective lens in a widthwise direction of a recording track and a second numerical aperture NA of said objective lens in an advancing direction of said recording track with respect to said pick-up position, said second numerical aperture NA being smaller than said first numerical aperture NA.

3. The recorded-information reproducing apparatus according to claim 2, wherein said means for controlling said objective lens comprises a diaphragm disposed adjacent said objective lens.

4. The recorded-information reproducing apparatus according to claim 3, wherein first numerical aperture NA is approximately 0.5 and said second numerical aperture NA is approximately 0.37.

5. The recorded-information reproducing apparatus according to claim 1, wherein said low-pass filter comprises an electronic filter.

6. The recorded-information reproducing apparatus according to claim 1, further comprising phase-equalizing means provided in a stage subsequent to said low-pass filter for correcting for phase distortion caused by said low-pass filter.

7. The recorded-information reproducing apparatus according to claim 1, further comprising means provided in a stage subsequent to said low-pass filter for lowering a low band of a frequency characteristic of a luminance signal contained in said read-out signal.

8. The recorded-information reproducing apparatus according to claim 1, further comprising means provided in a stage subsequent to said low-pass filter for raising a high band of a frequency characteristic of a luminance signal contained in said read-out signal.

* * * * *